US006699345B1

(12) United States Patent
Zingg

(10) Patent No.: US 6,699,345 B1

(45) Date of Patent: Mar. 2, 2004

(54) METHOD AND DEVICE FOR DISPOSAL OF WASTE PAPER GRIDS

(75) Inventor: Josef Zingg, Degersheim (CH)

(73) Assignee: Gallus Ferd Ruesch AG, St. Gallen (CH)

( * ) Notice: Subject to any disclaimer, the term of this patent is extended or adjusted under 35 U.S.C. 154(b) by 14 days.

(21) Appl. No.: 10/049,468

(22) PCT Filed: Jul. 7, 2000

(86) PCT No.: PCT/CH00/00375

§ 371 (c)(1),
(2), (4) Date: Aug. 1, 2002

(87) PCT Pub. No.: WO01/12397

PCT Pub. Date: Feb. 22, 2001

(30) Foreign Application Priority Data

Aug. 12, 1999 (EP) ........................................... 99115854

(51) Int. Cl.[7] ............................................... B29C 53/60

(52) U.S. Cl. ....................... 156/203; 156/247; 156/250; 156/267; 156/344; 156/584

(58) Field of Search ................................ 156/203, 247, 156/248, 250, 267, 344, 584

(56) References Cited

U.S. PATENT DOCUMENTS

| | | | | | |
|---|---|---|---|---|---|
| 3,522,136 | A | * | 7/1970 | Williams et al. | 156/584 |
| 4,346,855 | A | | 8/1982 | Biggar | |
| 4,809,602 | A | * | 3/1989 | Wheeler | 100/35 |
| 5,062,582 | A | * | 11/1991 | Harmon et al. | 242/412.2 |
| 6,547,913 | B1 | * | 4/2003 | Libby et al. | 156/248 |

FOREIGN PATENT DOCUMENTS

| | | |
|---|---|---|
| EP | 0 509 419 | 10/1992 |
| FR | 1 548 953 | 12/1968 |

* cited by examiner

*Primary Examiner*—Mark A. Osele
(74) *Attorney, Agent, or Firm*—Kenyon & Kenyon

(57) ABSTRACT

The method of the invention for disposal of waste paper grids in printing machines consists substantially in that the produced strip-shaped grids are spirally wound to form a tube-shaped body that can easily be further treated or disposed of. To this end, a spiral winding apparatus is used and arranged directly above the printing machine.

4 Claims, 1 Drawing Sheet

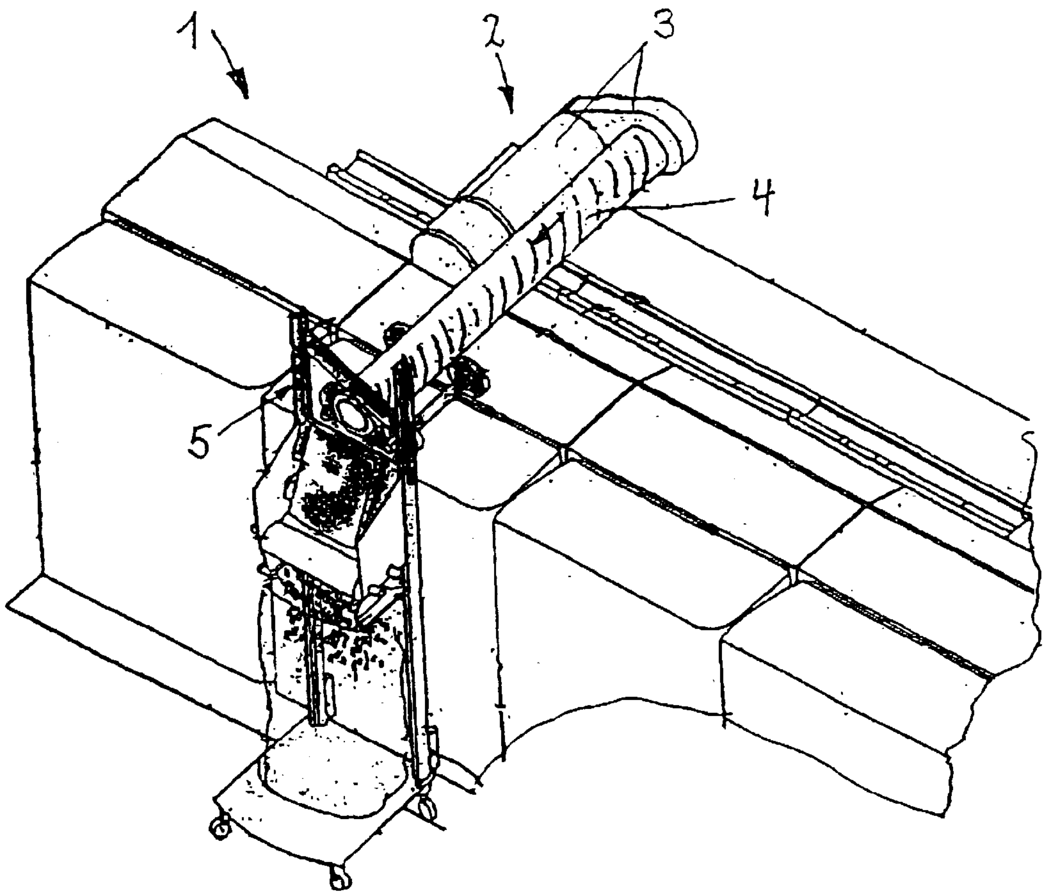
1
2
3
4
5

METHOD AND DEVICE FOR DISPOSAL OF WASTE PAPER GRIDS

BACKGROUND OF THE INVENTION

The present invention relates to a method for disposal of waste paper grids, particularly waste paper grids produced in printing machines, by forming the grids into tubes.

During printing processes, waste paper grids are produced (strips of plastic material or paper having relatively large cutout portions) that have to be disposed of or transferred for further treatment. In modem printing machines that operate at relatively high speeds, new solutions for disposal of waste paper grids are needed.

SUMMARY OF THE INVENTION

It is an object of the present invention to develop a method for disposing waste paper grids. The method is to permit relatively expeditious disposal of an increased amount of grids as compared to previous methods. The method should allow for continuous disposal, without machine stoppage. Also, the amount of space required to carry out the method should be relatively small.

This problem has been solved by providing a method for disposal of waste paper grids, which includes: seizing the paper grids; pulling off the paper grids at a predetermined speed; and forming an axially advancing, endless, cylindrical, tube-shaped body by spiral winding the paper grids.

The solution consists substantially in pulling off the appearing strip-shaped waste paper grids and rolling it spirally into a tube-like body. Any possibly remaining adhesive material on one side of the strip is thereby also rolled into the tube.

The device for carrying out the method forming of the invention therefore comprises an apparatus for spirally rolling strip material in order to form an endless tube that—when separated into tube sections—can be transferred for further treatment.

BRIEF DESCRIPTION OF THE DRAWINGS

An embodiment of the invention represented in the figure will be described hereinafter in more detail. What is shown is:

The FIGURE provides a schematic view of a device for disposal of waste paper strips produced in a printing machine.

DETAILED DESCRIPTION OF THE DRAWINGS

The FIGURE shows a portion of a modern printing machine 1 including a plurality of printing units arranged in series. At each location of the machine where waste paper grids appear (having various cutouts), a device 2 for disposal of the waste paper grids is arranged above-mentioned location.

The device 2 forms a pull off unit and consists substantially of a spiral winding apparatus 3 that seizes the strip-shaped grid and forms it into an axially advancing, endless tube-like body 4 (consisting of a plurality of overlapping wound grid layers). In part, this is accomplished by a spiral winding step.

Winding apparatus 3 is represented only in schematic form but can include draw-off cylinders and/or a winding mandrel provided for rolling the strip-shaped material spirally into a tube. With reference to the FIGURE, the tube advances in an endless manner to one side of machine 1.

On the side of the machine to which the tube advances, it is possible to provide an apparatus 5 that periodically cuts tube sections and forwards these sections for subsequent treatment. For example, apparatus 5 can be a shredder, in which the tube is shredded into small chips that can be received for disposal in a bag, or into a press. In a press tube sections can be further processed into flat plates that can be piled upon one another.

The method steps in accordance with the invention allow for waste paper strips to be disposed of continuously in a relatively small space and without stopping the machine. The method also brings the strips into forms that can be easily removed from the machine.

While the foregoing description and drawing represent the preferred embodiments of the present invention, it will be apparent to whose skilled in the art that various changes and modifications may be made therein without departing from the true spirit and scope of the present invention.

What is claimed is:

1. A method for disposal of waste paper grids in a printing machine, which comprises:

seizing the paper grids;

pulling off the paper grids at a predetermined speed; and forming an axially advancing, endless, cylindrical, tube-shaped body by spiral winding the paper grids.

2. The method according to claim 1, which further comprises:

cutting tube sections periodically from the tube-shaped body; and advancing the tube sections for one of further treatment and disposal.

3. The method according to claim 1, wherein the pulling off step is carried out by a pull-off apparatus; and wherein the forming step is carried out by a winding apparatus for spirally winding strip material to form a tube-shaped endless body.

4. The method according to claim 3, wherein the pull-off apparatus is part of the winding apparatus.

* * * * *